United States Patent
Emerson et al.

(10) Patent No.: US 9,460,611 B2
(45) Date of Patent: *Oct. 4, 2016

(54) SYSTEM AND METHOD FOR EMERGENCY COMMUNICATIONS

(75) Inventors: David E. Emerson, Overland Park, KS (US); Gary W. Lafreniere, Olathe, KS (US); Michael S. Goergen, Bend, OR (US); David C. Lando, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,367

(22) Filed: Aug. 6, 2012

(65) Prior Publication Data

US 2012/0317599 A1   Dec. 13, 2012

Related U.S. Application Data

(63) Continuation of application No. 12/482,937, filed on Jun. 11, 2009, now Pat. No. 8,253,558.

(51) Int. Cl.
| | |
|---|---|
| *G08B 1/08* | (2006.01) |
| *G08B 25/01* | (2006.01) |
| *H04N 21/258* | (2011.01) |
| *H04N 21/422* | (2011.01) |
| *H04N 21/4788* | (2011.01) |
| *H04N 21/61* | (2011.01) |

(52) U.S. Cl.
CPC ...... *G08B 25/016* (2013.01); *H04N 21/25841* (2013.01); *H04N 21/42202* (2013.01); *H04N 21/4788* (2013.01); *H04N 21/6193* (2013.01)

(58) Field of Classification Search
None
See application file for complete search history.

(56) References Cited

U.S. PATENT DOCUMENTS

| | | |
|---|---|---|
| 5,831,664 A | 11/1998 | Wharton et al. |
| 5,872,588 A | 2/1999 | Aras et al. |
| 6,532,589 B1 | 3/2003 | Proehl et al. |
| 6,684,240 B1 | 1/2004 | Goddard |
| 6,810,526 B1 | 10/2004 | Menard et al. |
| 7,478,414 B1 | 1/2009 | Glusker et al. |
| 7,571,458 B1 | 8/2009 | Eyal |
| 7,640,570 B2 | 12/2009 | Wagner et al. |
| 7,643,564 B2 | 1/2010 | Sheynman |
| 7,870,279 B2 | 1/2011 | Chuang et al. |
| 8,253,558 B2 * | 8/2012 | Emerson ............ G08B 25/016 340/539.13 |
| 8,260,363 B2 | 9/2012 | Roberts et al. |
| 8,286,215 B2 | 10/2012 | Daniels |
| 8,312,500 B2 | 11/2012 | Emerson et al. |

(Continued)

FOREIGN PATENT DOCUMENTS

EP   1650927 A2   4/2006

OTHER PUBLICATIONS

U.S. Appl. No. 12/201,249; Notice of Allowance dated Mar. 14, 2014; 31 pages.

(Continued)

*Primary Examiner* — Julie Lieu
(74) *Attorney, Agent, or Firm* — Swanson & Bratschun, L.L.C.

(57) ABSTRACT

A system and method for sending emergency communications. An indicator of an emergency is received through a set-top box. A location associated with the emergency is determined. A message indicating the emergency and the location associated with the emergency is sent from the set-top box.

20 Claims, 5 Drawing Sheets

(56) References Cited

U.S. PATENT DOCUMENTS

| | | | |
|---|---|---|---|
| 8,316,399 B1 | 11/2012 | Nush | |
| 8,467,275 B2 | 6/2013 | Emerson et al. | |
| 8,478,598 B2 | 7/2013 | Burckart et al. | |
| 8,584,189 B2 * | 11/2013 | Emerson | G08B 25/08 379/45 |
| 8,627,377 B2 | 1/2014 | LaFreniere et al. | |
| 8,627,399 B2 | 1/2014 | White et al. | |
| 8,731,620 B2 | 5/2014 | Roberts et al. | |
| 8,756,646 B2 | 6/2014 | LaFreniere et al. | |
| 8,789,113 B2 | 7/2014 | Goergen et al. | |
| 8,856,855 B2 | 10/2014 | Goergen et al. | |
| 9,106,976 B2 | 8/2015 | Emerson et al. | |
| 9,167,206 B2 | 10/2015 | Goergen et al. | |
| 9,215,419 B2 | 12/2015 | Rondeau et al. | |
| 9,300,993 B2 | 3/2016 | Goergen et al. | |
| 2001/0021994 A1 | 9/2001 | Nash | |
| 2002/0083468 A1 | 6/2002 | Dudkiewicz | |
| 2002/0100044 A1 | 7/2002 | Daniels | |
| 2002/0124252 A1 | 9/2002 | Schaefer et al. | |
| 2002/0129368 A1 | 9/2002 | Schlack et al. | |
| 2002/0147986 A1 | 10/2002 | Michael et al. | |
| 2002/0178451 A1 | 11/2002 | Ficco | |
| 2002/0184631 A1 | 12/2002 | Cezeaux et al. | |
| 2002/0188944 A1 | 12/2002 | Noble | |
| 2002/0188949 A1 | 12/2002 | Wang et al. | |
| 2002/0188959 A1 | 12/2002 | Piotrowski | |
| 2003/0005448 A1 | 1/2003 | Axelsson et al. | |
| 2003/0018977 A1 | 1/2003 | McKenna | |
| 2003/0066069 A1 | 4/2003 | Mankovich | |
| 2003/0128114 A1 * | 7/2003 | Quigley | G08B 19/005 340/506 |
| 2003/0128820 A1 | 7/2003 | Hirschberg et al. | |
| 2003/0194966 A1 | 10/2003 | Fellenstein et al. | |
| 2003/0208777 A1 | 11/2003 | Danker et al. | |
| 2004/0019807 A1 | 1/2004 | Freund | |
| 2004/0049785 A1 | 3/2004 | Grzeczkowski et al. | |
| 2004/0203651 A1 | 10/2004 | Qu et al. | |
| 2005/0091683 A1 | 4/2005 | Sheynman et al. | |
| 2005/0149987 A1 | 7/2005 | Boccon-Gibod et al. | |
| 2006/0020993 A1 | 1/2006 | Hannum et al. | |
| 2006/0087428 A1 * | 4/2006 | Wolfe | G08B 25/085 340/539.22 |
| 2006/0106499 A1 | 5/2006 | Roosli et al. | |
| 2006/0107297 A1 | 5/2006 | Toyama et al. | |
| 2006/0127038 A1 | 6/2006 | Kwon | |
| 2006/0184989 A1 | 8/2006 | Slothouber | |
| 2006/0212894 A1 | 9/2006 | Knudson et al. | |
| 2006/0253886 A1 | 11/2006 | Khurana et al. | |
| 2006/0294564 A1 * | 12/2006 | Guillorit | A61B 5/0002 725/108 |
| 2007/0079345 A1 | 4/2007 | McEnroe | |
| 2007/0079353 A1 | 4/2007 | Boortz | |
| 2007/0121651 A1 | 5/2007 | Casey et al. | |
| 2007/0150273 A1 | 6/2007 | Yamamoto et al. | |
| 2007/0154163 A1 | 7/2007 | Cordray | |
| 2007/0220554 A1 | 9/2007 | Barton et al. | |
| 2007/0280445 A1 | 12/2007 | Shkedi | |
| 2007/0280446 A1 | 12/2007 | Hsieh et al. | |
| 2007/0287498 A1 * | 12/2007 | Wang | G06Q 10/087 455/556.1 |
| 2008/0000479 A1 * | 1/2008 | Elaz et al. | 128/204.23 |
| 2008/0004904 A1 * | 1/2008 | Tran | 705/2 |
| 2008/0059992 A1 | 3/2008 | Amidon et al. | |
| 2008/0107244 A1 | 5/2008 | Setzer et al. | |
| 2008/0115164 A1 | 5/2008 | Kiiskinen | |
| 2008/0125098 A1 | 5/2008 | Bruce et al. | |
| 2008/0134043 A1 | 6/2008 | Georgis et al. | |
| 2008/0227429 A1 * | 9/2008 | Hodgson et al. | 455/404.2 |
| 2008/0228733 A1 | 9/2008 | Davis et al. | |
| 2008/0301732 A1 | 12/2008 | Archer et al. | |
| 2009/0052870 A1 | 2/2009 | Marsh et al. | |
| 2009/0069038 A1 | 3/2009 | Olague et al. | |
| 2009/0070828 A1 | 3/2009 | Stomakhin et al. | |
| 2009/0089844 A1 | 4/2009 | Beyabani | |
| 2009/0133069 A1 | 5/2009 | Conness et al. | |
| 2009/0133070 A1 | 5/2009 | Hamano et al. | |
| 2009/0150925 A1 | 6/2009 | Henderson | |
| 2009/0158325 A1 | 6/2009 | Johnson | |
| 2009/0158382 A1 | 6/2009 | Shaffer et al. | |
| 2009/0164559 A1 | 6/2009 | Johnson et al. | |
| 2009/0217324 A1 | 8/2009 | Massimi | |
| 2009/0217332 A1 | 8/2009 | Hindle et al. | |
| 2009/0228929 A1 | 9/2009 | Cass | |
| 2009/0248828 A1 | 10/2009 | Gould et al. | |
| 2009/0249387 A1 | 10/2009 | Magdy et al. | |
| 2009/0249451 A1 | 10/2009 | Su et al. | |
| 2009/0265737 A1 | 10/2009 | Issa et al. | |
| 2009/0276224 A1 | 11/2009 | Medina et al. | |
| 2009/0293079 A1 | 11/2009 | McKee et al. | |
| 2009/0300695 A1 | 12/2009 | White et al. | |
| 2010/0058395 A1 | 3/2010 | Goergen et al. | |
| 2010/0058415 A1 | 3/2010 | Goergen et al. | |
| 2010/0058416 A1 | 3/2010 | LaFreniere et al. | |
| 2010/0058417 A1 | 3/2010 | Rondeau et al. | |
| 2010/0064325 A1 | 3/2010 | Fishman et al. | |
| 2010/0125884 A1 | 5/2010 | Howcroft | |
| 2010/0149302 A1 | 6/2010 | Malik | |
| 2010/0169944 A1 | 7/2010 | Rondeau et al. | |
| 2010/0186038 A1 | 7/2010 | Thomas et al. | |
| 2010/0211970 A1 | 8/2010 | Howarter et al. | |
| 2010/0211972 A1 | 8/2010 | Howarter et al. | |
| 2010/0251325 A1 | 9/2010 | Gupta | |
| 2010/0261466 A1 | 10/2010 | Chang et al. | |
| 2010/0267361 A1 * | 10/2010 | Sullivan | 455/404.2 |
| 2010/0319021 A1 | 12/2010 | Emerson et al. | |
| 2011/0002259 A1 | 1/2011 | Schultz et al. | |
| 2011/0126251 A1 | 5/2011 | LaFreniere et al. | |
| 2011/0126257 A1 | 5/2011 | Goergen et al. | |
| 2011/0131604 A1 | 6/2011 | Van Hoff et al. | |
| 2011/0215811 A1 | 9/2011 | Lenzie et al. | |
| 2011/0270952 A1 | 11/2011 | Ray et al. | |
| 2012/0018510 A1 * | 1/2012 | Gardner | 235/379 |
| 2012/0223134 A1 * | 9/2012 | Smith et al. | 235/379 |
| 2012/0223135 A1 * | 9/2012 | Meek et al. | 235/379 |
| 2012/0233638 A1 | 9/2012 | Slaney et al. | |
| 2012/0324003 A1 | 12/2012 | Armstrong et al. | |
| 2013/0031590 A1 | 1/2013 | Ivanov et al. | |
| 2013/0074109 A1 | 3/2013 | Skelton et al. | |
| 2013/0241726 A1 * | 9/2013 | Hunter et al. | 340/5.4 |
| 2013/0305275 A1 | 11/2013 | Emerson et al. | |
| 2014/0053190 A1 | 2/2014 | Sirpal | |
| 2014/0066003 A1 * | 3/2014 | Emerson | G08B 25/08 455/404.2 |
| 2014/0074621 A1 | 3/2014 | Chai et al. | |
| 2014/0130093 A1 | 5/2014 | Goergen et al. | |
| 2014/0259081 A1 | 9/2014 | Chatterjee | |
| 2014/0282705 A1 | 9/2014 | Chatterjee et al. | |
| 2015/0296261 A1 | 10/2015 | Emerson et al. | |
| 2016/0029062 A1 | 1/2016 | Rondeau et al. | |
| 2016/0165317 A1 | 6/2016 | Goergen et al. | |

OTHER PUBLICATIONS

U.S. Appl. No. 12/201,313; NonFinal Office Action dated Mar. 26, 2014; 10 pages.

U.S. Appl. No. 12/201,313; Final Office Action dated Oct. 23, 2014; 11 pages.

U.S. Appl. No. 12/201,313; Final Office Action dated Feb. 27, 2015; 11 pages.

U.S. Appl. No. 14/152,696; Notice of Publication dated May 8, 2014; 1 page.

U.S. Appl. No. 12/201,273; NonFinal Office Action dated Apr. 10, 2014; 35 pages.

U.S. Appl. No. 12/201,273; Final Office Action dated Oct. 27, 2014; 38 pages.

U.S. Appl. No. 12/201,273; Notice of Allowance dated Mar. 16, 2015; 28 pages.

U.S. Appl. No. 12/201,436; Final Office Action dated Apr. 25, 2014; 30 pages.

U.S. Appl. No. 13/750,537; Notice of Allowance dated Jan. 10, 2014; 11 pages.

U.S. Appl. No. 12/347,414; Final Office Action dated Feb. 3, 2014; 16 pages.

(56) References Cited

OTHER PUBLICATIONS

U.S. Appl. No. 12/347,414; NonFinal Office Action dated Sep. 11, 2014; 17 pages.
U.S. Appl. No. 12/347,414; Final Office Action dated Feb. 3, 2015; 17 pages.
U.S. Appl. No. 12/625,744; Notice of Allowance dated Feb. 5, 2014; 26 pages.
U.S. Appl. No. 12/625,762; Notice of Allowance dated Jun. 3, 2014; 18 pages.
U.S. Appl. No. 13/787,371; NonFinal Office Action dated Apr. 9, 2014; 30 pages.
U.S. Appl. No. 13/787,371; Final Office Action dated Aug. 22, 2014; 32 pages.
U.S. Appl. No. 13/787,371; Notice of Publication dated Sep. 11, 2014; 1 page.
U.S. Appl. No. 13/787,371; NonFinal Office Action dated Mar. 5, 2015; 40 pages.
U.S. Appl. No. 13/962,531; Notice of Publication dated Sep. 19, 2014; 1 page.
U.S. Appl. No. 13/962,531; NonFinal Office Action dated Dec. 18, 2014; 47 pages.
Parchomovsky, Gideon et al., "Fair Use Harbors"; 93 Va. L. Rev. 1483 (2007).
U.S. Appl. No. 13/910,706; Notice of Allowance dated Mar. 26, 2015; 30 pages.
U.S. Appl. No. 13/962,531; Final Office Action dated Jun. 19, 2015; 30 pages.
U.S. Appl. No. 12/201,313; NonFinal Office Action dated Jul. 1, 2015; 19 pages.
U.S. Appl. No. 14/152,696; NonFinal Office Action dated Aug. 21, 2015; 26 pages.
U.S. Appl. No. 12/347,414; Notice of Allowance dated Jul. 7, 2015; 20 pages.
U.S. Appl. No. 13/787,371; Final Office Action dated Jul. 30, 2015; 50 pages.
U.S. Pat. No. 9,083,851, Jul. 14, 2015, Goergen et al. (withdrawn).
U.S. Appl. No. 12/201,313; Notice of Allowance dated Nov. 10, 2015; 13 pages.
U.S. Appl. No. 13/787,371; NonFinal Office Action dated Nov. 20, 2015; 50 pages.
U.S. Appl. No. 13/962,531; NonFinal Office Action dated Nov. 4, 2015; 36 pages.
U.S. Appl. No. 14/152,696; Final Office Action dated Jan. 21, 2016; 23 pages.
U.S. Appl. No. 13/787,371; Final Office Action dated Apr. 5, 2016; 48 pages.
U.S. Appl. No. 13/962,531; Final Office Action dated Apr. 14, 2016; 34 pages.
U.S. Appl. No. 14/747,843; NonFinal Office Action dated Apr. 6, 2016; 30 pages.
U.S. Appl. No. 14/878,226; NonFinal Office Action dated Jun. 15, 2016; 22 pages.
U.S. Appl. No. 14/152,696; NonFinal Office Action dated Jul. 1, 2016; 50 pages.
U.S. Appl. No. 13/787,371; NonFinal Office Action dated Jul. 28, 2016; 48 pages.
U.S. Appl. No. 13/962,531; NonFinal Office Action dated Aug. 2, 2016; 35 pages.
U.S. Appl. No. 14/747,843; Final Office Action dated Jul. 14, 2016; 34 pages.

\* cited by examiner

FIG. 5

| Graphical User Interface | 500 |
|---|---|

| 504 ☑ SELF HELP | 502 ☑ EMERGENCY |
|---|---|

506

Current Location

User description: Forest Service Cabin in Wyoming, C.R. 432 four miles past bridge to Little Greys on the East side of the river
Degrees Minutes Seconds:
Latitude: 42-43'30" N
Longitude: 110-55'55" W Decimal Degrees:
Latitude: 42.7249282
Longitude: -110.9318687

508

| Menu |
|---|
| Natural Disaster |
| Lost |
| Injured |
| Sick |

| Symptoms |
| Medication |
| Treatment |

- Get help and chew up an aspirin if you are not allergic

| Symptoms | 510 |
|---|---|

A heart attack often starts with mild symptoms that may not be painful. Many victims experience a tightness or squeezing sensation in the chest. Get emergency medical help immediately If you experience any of the following symptoms for two minutes or more:
- Pressure, fullness, squeezing or pain in the center of the chest.
- Pain spreading to the shoulders, neck or arms.
- Severe pain, sudden weakness, dizziness, fainting, sweating, nausea or shortness of breath.
- For those with angina, any change in the frequency, duration or intensity of the attacks, or symptoms that don't respond to nitroglycerin.

SYSTEM AND METHOD FOR EMERGENCY COMMUNICATIONS

CROSS REFERENCE TO RELATED APPLICATIONS

This application is a Continuation of U.S. patent application Ser. No. 12/482,937 filed on Jun. 11, 2009 now U.S. Pat. No. 8,253,558 entitled SYSTEM AND METHOD FOR EMERGENCY COMMUNICATION OF A LOCATION THROUGH A SET-TOP BOX which incorporates by reference utility application Ser. No. 12/412,214, entitled SYSTEM AND METHOD FOR DIALING 911 FROM TV REMOTE filed on Mar. 26, 2009 and utility application Ser. No. 12/482,919, entitled SYSTEM AND METHOD FOR EMERGENCY COMMUNICATIONS THROUGH A SET-TOP BOX filed on Jun. 11, 2009.

BACKGROUND

Communications technologies have grown nearly exponentially in recent years. The advancement and growth of the communications industry is fostered by enhanced services, smaller and more efficient devices and well engineered standards and protocols. In some cases, legacy communications systems and devices have not kept pace with the rapid changes in the communications industry. For example, many users that live in remote locations or travel to different parts of the world may not have access to standard plain old telephone services (POTS), data connections, wireless services, and emergency services. As a result, in many cases, users may find themselves in a position in which they are unable to efficiently contact emergency services or personnel without traveling great distances or they are forced to deal with an emergency situation by themselves.

SUMMARY

One embodiment provides a system and method for sending emergency communications. An indicator of an emergency is received through a set-top box. A location associated with the emergency is determined. A message indicating the emergency and the location associated with the emergency is sent from the set-top box.

Another embodiment provides a network device for communicating media content to a display. The network device may include a processor for executing a set of instructions and a memory for storing the set of instructions. The instructions may be executed to receive an indicator of an emergency through a network device, determine a location associated with the emergency, and send a message indicating the emergency and the location associated with the emergency from the network device.

Yet another embodiment provides a network device for generating emergency communications. The network device may include a user interface operable to receive user input. The network device may further include location logic operable to determine a location of the network device. The network device may further include emergency logic in communication with the location logic. The emergency logic may be operable to determine that there is an emergency and generate a message indicating the location and the emergency. The network device may further include a transceiver in communication with the emergency logic. The transceiver may be operable to send the message to an emergency service provider associated with the location.

BRIEF DESCRIPTION OF THE DRAWINGS

Illustrative embodiments of the present invention are described in detail below with reference to the attached drawing figures, which are incorporated by reference herein and wherein:

FIG. 5 is a pictorial representation of a graphical user interface in accordance with an illustrative embodiment.

DETAILED DESCRIPTION OF THE DRAWINGS

The illustrative embodiments of the present invention provide a system and method for sending emergency communications from a set-top box. The emergency communications may include a discreet emergency message communicated to an emergency service provider by way of a satellite in orbit. In another embodiment, the emergency communication may be a real-time two-way communication between the user and an emergency service provider in which the communications are routed through the set-top box, a satellite transceiver, one or more geosynchronous satellites and additional emergency communication systems, equipment, and devices in communication with the orbiting satellites. The emergency communication of a message may be sent in one or more packets, parts or components. For example, the emergency message may include multiple data transmissions that are reassembled to form the emergency message.

The set-top box is a conversion device operable to format media content for display by one or more televisions or other similar displays. In particular the set-top box may be a device configured to decode a satellite signal, convert and format the signal into a signal displayable by the television, and then communicate the reformatted signal to the television for display to the user. The set-top box may include a digital video recorder (DVR), personal video recorder (PVR), or other memory operable to store media content for display as selected by the user.

The set-top box may be connected to or communicate with a satellite dish and satellite transceiver. The satellite dish and transceiver may also be configured to receive global positioning system (GPS) information and signals. The GPS signals may be utilized to determine the location of the set-top box. The location of the set-top box may be particularly important for users that utilize the set-top box from within a recreational vehicle (RV), boat, rural home, or other location that may be remote or mobile. As a result, the user may be able to send emergency information indicating that the user or other individual is experiencing an emergency. In one embodiment, the emergency communication from the set-top box may include the location of the set-top box as determined by the set-top box and interconnected satellite transceiver. In another embodiment, emergency information may also include user specified information, such as the type and severity of the emergency being experienced and the reason for sending the emergency communication.

Figure 1:
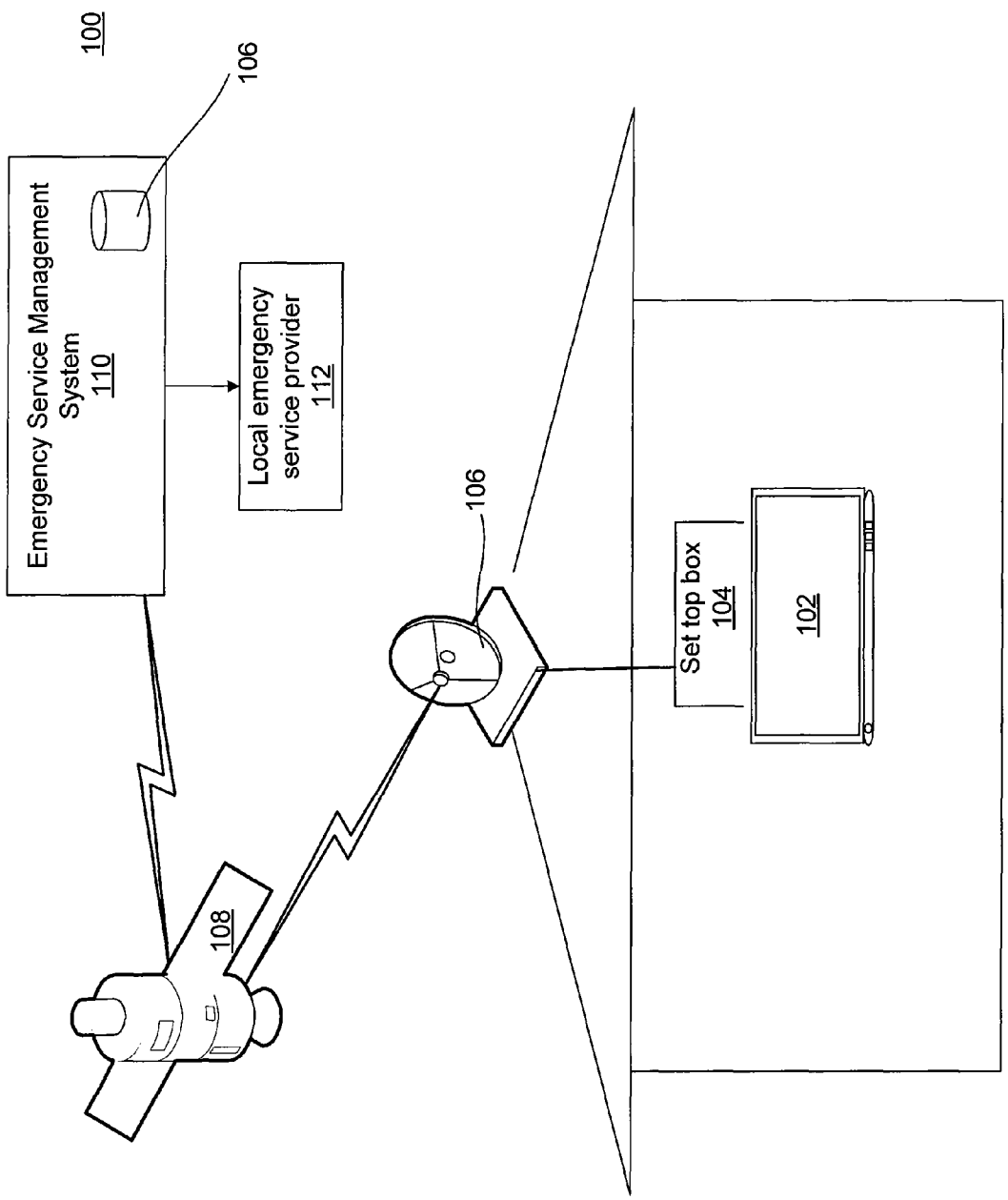
FIG. 1 is a pictorial representation of a satellite communications system in accordance with an illustrative environment.

FIG. 1 is a pictorial representation of a satellite communications system in accordance with an illustrative environment. FIG. 1 shows a simplified embodiment of a satellite communications system 100. The satellite communications system 100 may include any number of devices, systems and equipment. In one embodiment, the satellite communication system 100 includes a television 102, a set-top box 104, a satellite transceiver 106, a satellite 108, an emergency service management system 110, customer database 111, and a local emergency service provider 112.

The television 102 is one embodiment of a display. A display is a device operable to communicate media content to a user. The display may utilize audible, visual, and tactile information to display the media content. In other embodiments, the television 102 may be a computer monitor, Braille pad, touch screen computing device, computer, or other device suitable for communicating media content as herein described. The media content may include television programs, movies, Internet content, pictures, data or other elements that may be communicated from the satellite 108 to the satellite transceiver 106 for formatting and conversion by the set-top box 104 before being ultimately displayed by the television 102.

The set-top box 104 may be an intelligent network device issued or purchased by the user to display content received from a satellite communications service provider. In one embodiment, the set-top box 104 may include decoding hardware, software, and logic that decode the satellite signals for display to the television 102. For example, the set-top box 104 may include any number of keys, passwords or other authentication elements, schemes, or modules that confirm the user is authorized to receive and decode the satellite signal.

The set-top box 104 may communicate with the television 102 utilizing any number of connectors, signals, protocols, or cables. In one embodiment, the set-top box 104 may communicate with the television utilizing a high definition media interface (HDMI). In other embodiments, the television 102 and set-top box 104 may communicate utilizing RCA connectors, a cable interface, Bluetooth, Wi-Fi or other wired or wireless connections. In one embodiment, the set-top box 104 and the television 102 are devices that are networked together. In another embodiment, the set-top box 104 and the television 102 may be integrated as a single media device.

The satellite transceiver is the interface configured to send and receive signals to and from the satellite 108. In one embodiment, the satellite transceiver 106 may include a miniature satellite dish or antenna configured to manually or automatically locate the satellite 108. The satellite transceiver 106 may also include the hardware and software integrated with the set-top box 104 that may be configured to encode, decode, format or otherwise process signals sent and received by the set-top box 104. For example, the satellite transceiver 106 may automatically reposition itself to send an emergency communication or utilize a secondary transceiver or cellular communication equipment.

The satellite 108 represents one or more satellite devices orbiting earth. In one embodiment, the satellite 108 may be in a geosynchronous orbit for directing and receiving signals by the satellite transceiver 106 and any number of other satellite transceivers and set-top boxes that users may employ. Any number of satellite orbits, transmissions protocols, and standards may be utilized to enable communication between the satellite transceiver 106 and the satellite 108.

The emergency service management system 110 is the devices, system, and equipment operable to send and receive signals to and from the satellite 108. The emergency service management system 110 may include a communications management system utilized by one or more communications service providers or satellite service providers to manage communications with one or more satellites. The emergency service management system 110 may be integrated with or communicate with the communications management system.

The communications management system is one or more devices utilized to enable, initiate, route, and manage communications between one, or more communications devices including televisions, set-top boxes, telephones, central offices, switches, routers, computing devices, and other communications equipment. The communications management system may include one or more devices networked to manage the satellite communication system 100. For example, the communications management system may include any number of servers, routers, switches, or advanced intelligent network devices. The emergency service management system 110 may communicate with any number of wireless and wired communications networks. The communications networks may send and receive the electronic signals through any number of transmission mediums. The communications network may include various fiber optics, cables, wires, transmission towers, antennas, or other elements for transmitting media, data, and voice communications to the communications devices of the satellite communications system 100.

In one embodiment, the emergency service management system 110 may include the customer database 111. The customer database 111 is a database that stores information for a number of customers. The customer database 111 may store an address or location associated with the user, emergency contact information including phone numbers, email addresses, and usernames, physical directions to the user's residence or last known location and other similar details or information. The customer database 111 may access or include one or more other databases operated by the communications service provider, government, state, or other organization to route the emergency communication with the corresponding user information to the appropriate emergency service provider.

The local emergency service provider 112 is one embodiment of a communications system, equipment, or devices utilized by an emergency service provider servicing an area, region or location that corresponds to the set-top box 104. For example, the local emergency service provider 112 may represent a dispatcher that receives emergency communications from a central location. In another embodiment, the local emergency service provider may represent a server configured to receive emergency messages and communicate those messages to emergency service rescue teams, firefighters, police officers, medical flight teams, paramedics, Coast Guard, ski patrols, government services or other groups, individuals or organizations that respond to emergency communications and situations.

The set-top box 104 and corresponding satellite transceiver 106 or satellite dish are operable to receive communications from the satellite 108 as well as global positioning satellites, not specifically shown. In one preferred embodiment, the set-top box 104 may receive signals from three or more global positioning satellites. The global position signals may be converted to data, measurements, or information utilized to determine the location of the set-top box 104. In particular, the location may be determined to amount of error or an approximation allowed by governmental rules and regulations as well as the accuracy of the set-top box 104 and satellite transceiver 106.

The set-top box 104 may be configured to store the current location of the set-top box 104 as well as previous locations of the set-top box 104. In one embodiment, the set-top box 104 may automatically determine global positioning information including the current location of the set-top box 104 when activated. In other embodiments, the set-top box 104 may determine the location at set intervals such as once a day, every 15 minutes, or three times daily.

The global positioning information may also be determined by docking or linking a GPS device with the set-top box. For example, a user may enjoy hiking from his or her RV and as a result at the end of each hike as the user enters the trailer or other shelter the GPS device may take a last measurement that is synchronized with the set-top box 104 through a wireless connection such as Wi-Fi or Bluetooth. In one embodiment, the set-top box 104 may act as a wireless router base device or transceiver for communications to an external GPS device that may automatically or manually connect to the GPS device. In another example, the set-top box 104 may include an integrated or external docking cradle for downloading GPS information into the set-top box 104 for storage and utilization by the user. For example, the set-top box 104 may allow the user to view trips or travels of the user as determined by the external GPS device on the television 102 utilizing any number of mapping or global positioning applications or logic implemented by the set-top box 104.

In the event that an emergency is automatically or manually detected by the set-top box 104 an emergency communication may be generated by the set-top box 104 and transmitted from the satellite transceiver 106 to the satellite 108. The satellite 108 may then relay the emergency communication to one or more ground based communications systems which may include the emergency service management system 110. The emergency service management system 110 may utilize a location database, emergency type or classification, or other information that may be included in the emergency communication to send the emergency communication to a central emergency services device, organization, or directly to the local emergency service provider 112. As a result, a local emergency service provider 112 may dispatch personnel, equipment or other resources to deal with the emergency reported from the set-top box 104. Additional figures may further describe how an emergency is detected, determined or received by the set-top box 104 as well as the processes and steps that may be utilized and one or more user interfaces that may be utilized to receive information and display relevant information to the user.

Figure 2:
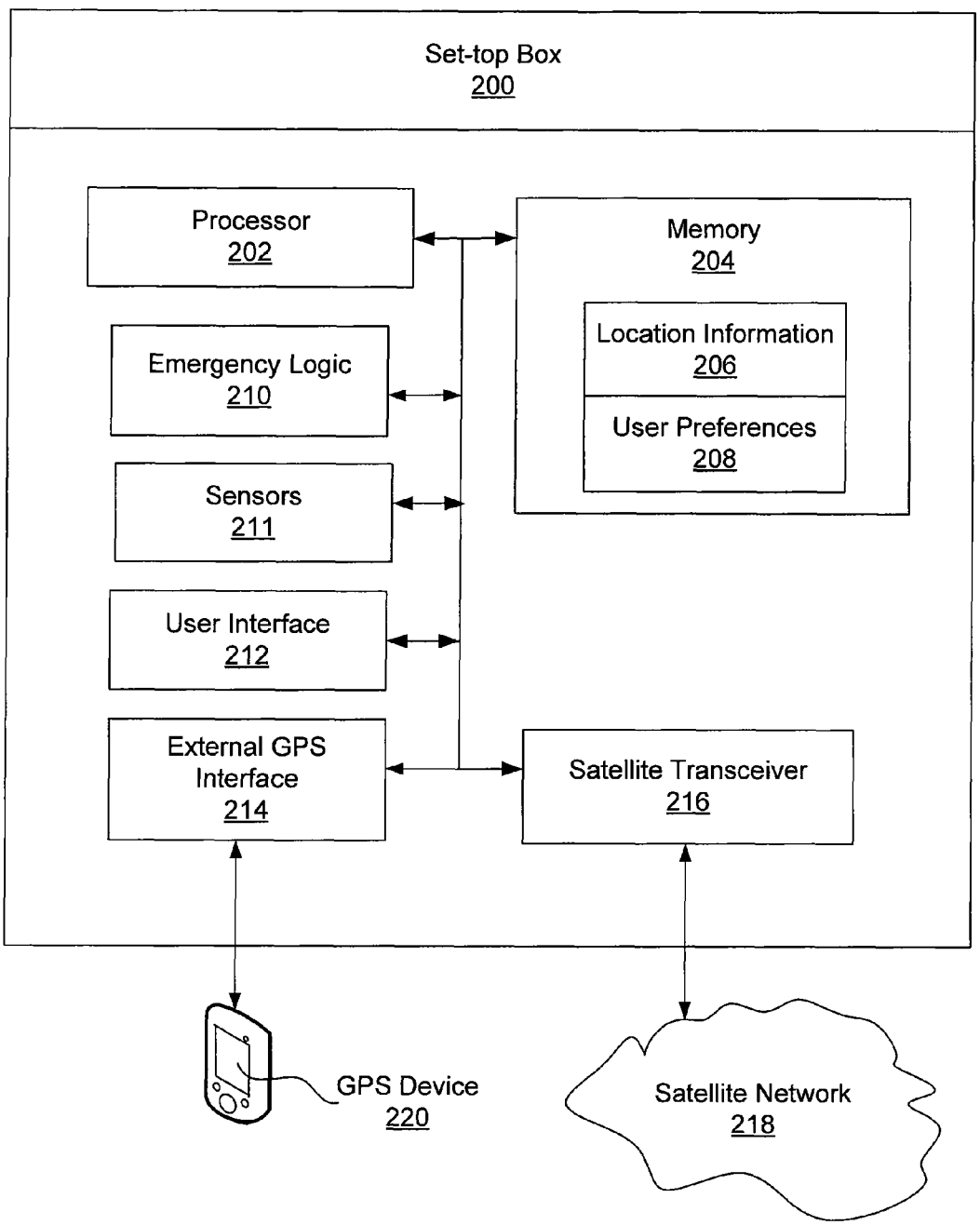
FIG. 2 is a block diagram of a set-top box in accordance with an illustrative embodiment.

FIG. 2 is a block diagram of a set-top box in accordance with an illustrative embodiment. The set-top box 200 of FIG. 2 is a particular implementation of the set-top box 104 of FIG. 1. The set-top box 200 may include a processor 202, a memory 204, location information 206, user preferences 208, emergency logic 210, sensors 211, a user interface 212, an external GPS interface 214 and a satellite transceiver 216. The set-top box 200 may further communicate with a satellite network 218 and a GPS device 220.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums. The set-top box 200 may include any number of computing and telecommunications components, devices or elements which may include busses, motherboards, circuits, ports, interfaces, cards, converters, adapters, connections, transceivers, displays, antennas, and other similar components.

In one embodiment, the steps and determinations performed by the set-top box 200 may be implemented by executing modules or instructions stored in the memory 204. For example, all of the components of the set-top box 200 may be stored as modules in the memory 204 for execution by the processor 202. The location information 206 is information, data or other details that describe the location of the set-top box 200. As previously described, the set-top box 200 may store current and past locations enabling the user to map out routes, destinations, time spent at each destination and other related information. The location information 206 may be configured to store the most recent location of the set-top box 200 as automatically or manually determined by the satellite transceiver 216 or the GPS device 220 through communications with the external GPS interface 214.

In one embodiment, the location information 206 may store information entered or input by the user. For example, the set-top box 200 may be mounted and utilized within a yacht. As a result, the user may enter an approximate location based on recent ports, star positioning, readings of global positioning devices, maps, or other similar information. For example, a user may utilize a remote control or the set-top box 200 to indicate the user was most recently sailing off the coast of Puerto Rico near the town of Guayama.

The user preferences 208 are the preferences, parameters, and conditions that may govern automatic or manual steps taken by the set-top box 200. In one embodiment, the user preferences 208 may control how an emergency menu is displayed to the user. For example, the user preferences 208 may require that a user verify that there is indeed an emergency before sending the emergency communications to prevent inadvertently sending an emergency communication. The user preferences 208 may also control how one or more menus that provide information regarding emergencies may be displayed to the user. Any number of different preferences, passwords, schemes, connection information or other details may be stored in the user preferences 208.

The satellite transceiver 216 is operable to send and receive communications to the satellite network 218. The satellite transceiver 216 may also be configured to determine the location of the set-top box 200 utilizing global positioning technology to mathematically and geometrically determine the location of the set-top box utilizing the signals from the satellite network 218. The satellite transceiver 216 may also transmit the emergency communication through the satellite network 218 once generated by the emergency logic 210 and other components of the set-top box 200.

The emergency logic 210 is the logic operable to determine whether there is an emergency and generate the emergency communication in response to determining there is an emergency. In one embodiment, the emergency logic 210 generates a message similar to an e-mail or a text message that is communicated via a satellite transmission. The emergency communication may include the location as determined by the satellite transceiver 216 as well as other details, data, and information from the location information 206. In one embodiment, the emergency logic 210 may determine there is an emergency based on a user selection of a specified button or button combination on the set-top box 200 or utilizing a remote control in communication with the set-top box 200. For example, by entering the channel or code 911 the emergency logic 210 may command the user interface 212 to display an emergency message that asks the user if there is an emergency. Then in response to one or more affirmative responses the emergency logic 210 may generate the emergency communication.

The sensors 211 are measurement devices integrated with or external to the set-top box 200 configured to detect certain environmental or ambient conditions. In one embodiment, the sensors 211 may include smoke sensors, carbon monoxide sensors, toxic gas sensors, water sensors, wind sensors, accelerometers and other similar measurement or detection devices suitable for determining the condition of the set-top box 200. In one embodiment, the sensors 211 may send a signal or a command to the emergency logic 210 that may utilize the sensory information to generate the emergency message automatically for communication to the satellite network 218. For example, in response to the sensors 211 detecting unacceptable levels of smoke and an elevated temperature of 180 degrees, the emergency logic 210 may generate an emergency communication including the name associated with the user of the set-top box 200 and the location information 206 as determined by the satellite transceiver 216 and as received and stored in the user preferences 208.

The user interface 212 is the interactive audio, visual, and tactile elements for receiving user input and communicating information to the user. In one embodiment, the user interface 212 displays a special screen and menu to the user based on selection of a specific channel. For example, channel 911 may be linked with emergency services. If the user selects channel 911, the user interface 212 may display a graphical user interface that displays and receives information from a user through a remote control, voice command, button selections or other communications. The external GPS interface 214 may be a hardwired or wireless interface for communication with the GPS device 220. For example, the GPS device 220 may be a handheld GPS for hiking, walking or street navigation. In another embodiment, the GPS device 220 may be a maritime or vehicle GPS that may be docked to the external GPS interface 214, interconnected through a cable or other element, or wirelessly linked utilizing a connection such as Bluetooth.

The external GPS interface 214 is a hardware and software interface for communicating information between the GPS device 220 and the set-top box 200. The external GPS interface 214 may be configured to access and store information retrieved from the GPS device 220 in the location information 206. In one embodiment, a timestamp may be linked with the location stored in the location information 206. As a result, the set-top box 200 may utilize an internal or external clock to determine whether the most recently determined location is still relevant. For example, in the event of a boat overturning or an RV accident, the set-top box 200 may be unable to determine the current location. As a result, the most recently recorded location information may be communicated in the emergency communication to the satellite network 218 with a time indicating when the last location reading was taken. In one embodiment, the location information 205 may also store past or known locations. For example, a known harbor or RV park may be stored as a favorite, destination location, or most recent location. Specific GPS coordinates may also be stored. In one embodiment, the location information may be linked with a calendar stored within the set-top box 200 or on a network device for setting the actual or likely location based on the date.

In another embodiment, the user interface 212 may display menus that may be utilized to address emergency situations. For example, the user interface 212 may provide a menu addressing steps to take in the event of a snakebite as well as presenting pictures and imagers in order to properly diagnose the type of snake that has bitten a user. In one embodiment, the user logic 210 may prompt a user to enter information indicating the circumstances surrounding the emergency. For example, this emergency information may indicate that a user has been attacked by an animal, suffered an injury, is extremely ill, is having an allergic reaction, is experiencing a flood, or other emergency circumstances that may require help or assistance. The user interface 212 may provide information details, steps, or other details that may be utilized by the user or other individuals in proximity to the set-top box 200 to address the emergency situation or conditions.

Figure 3:
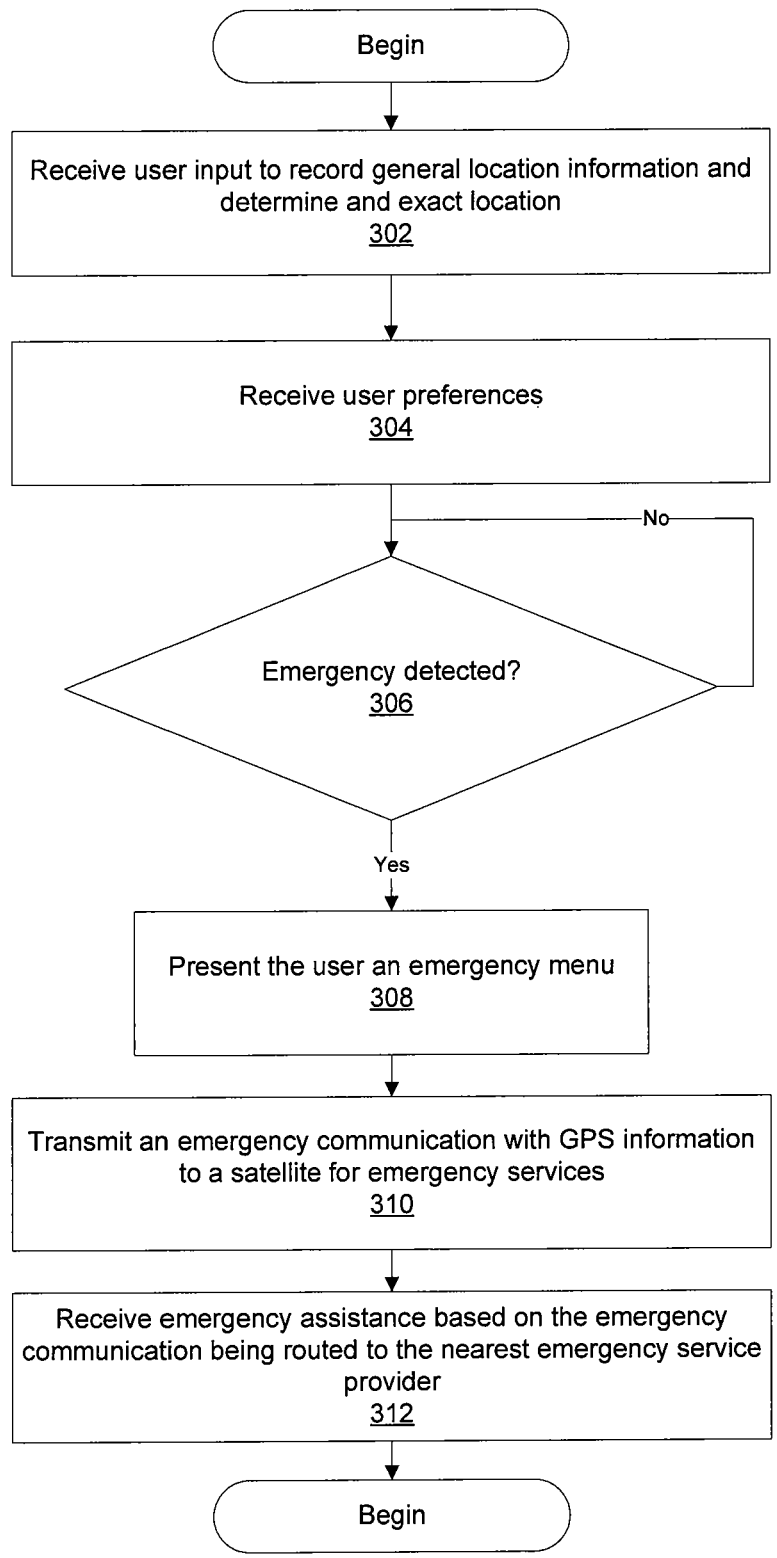
FIG. 3 is a flowchart of a process for emergency communications through a set-top box in accordance with an illustrative embodiment.

FIG. 3 is a flowchart of a process for emergency communications through a set-top box in accordance with an illustrative embodiment. The process of FIG. 3 may be implemented by a user utilising a set-top box. The set-top box may communicate with one or more displays to display information and receive user input. For example, the set-top box may communicate with a high definition organic light emitting diode (OLED) television and receive user input through a next generation Bluetooth remote control.

The process of FIG. 3 may begin by receiving user input to record general location information and determine an exact location (step 302). The general location information may be received by prompting a user to enter applicable details regarding the location. For example, the user may be traveling through Afton, Wyo. on her way to Yellowstone National Park and may enter the name of the city or a zip code as part of the general location information. The set-top box may utilize the integrated GPS to receive signals from multiple GPS satellites to determine the exact location. The different locations may be stored within a memory of the set-top box for subsequent access, retrieval, and utilization to generate an emergency communication.

Next, the set-top box receives user preferences (step 304). The user preferences of step 304 may provide information for generating an emergency communication. For example, the user preferences may command the set-top box to power up every half an hour, if a power source is available, to determine the most current location. The user preferences may also associate one or more channels with an emergency menu. As a result, by receiving user input to tune to a specified channel, the emergency menu and options may be automatically presented to the user.

Next, the set-top box determines whether an emergency is detected (step 306). In one embodiment, the emergency is detected based on a proactive user selection indicating an emergency status, condition, or need. In another embodiment, the emergency may be detected based on one or more sensors in the set-top box. For example, the set-top box may be mounted or installed within a cabinet or entertainment center of a RV or boat. In response to determining the set-top box is on its side utilizing one or more accelerometers and detecting water the set-top box may automatically determine that an emergency is detected. If an emergency is not detected, step 306 is repeated or alternatively step 302 may be repeated.

Next, the set-top box presents the user an emergency menu (step 308). In one embodiment, the emergency menu may provide a user information to address the emergency situation conditions or environment. For example, the emergency menu may provide a user information of how to deal with a jellyfish or shark bite. The emergency menu may alternatively confirm that there is indeed an emergency so that an emergency communication is not sent unnecessarily.

Next, the set-top box transmits an emergency communication with GPS information to a satellite for routing to emergency services (step 310). During step 310, the set-top box generates the emergency communication and then sends the communication with global positioning information and emergency information that may have been received from the user based on input or feedback from the emergency menu or based on the original reporting of an emergency. In one embodiment, the set-top box may also have a satellite transceiver or other emergency signaling beacon that may transmit a signal that may be received by other commercial or organizational systems or users. For example, a cell signal may be sent to cell towers or receivers within range with a text-to-voice application converting the global positioning information and user information into words and details that may be utilized by emergency personnel to address the issue.

Next, the set-top box receives emergency assistance based on the emergency communication being routed to the nearest emergency service provider (step 312). Step 312 is not indicative of a step performed by the set-top box but rather indicates the fruition of the emergency communication process as described in FIG. 3 to rescue or provide assistance to the user.

Figure 4:
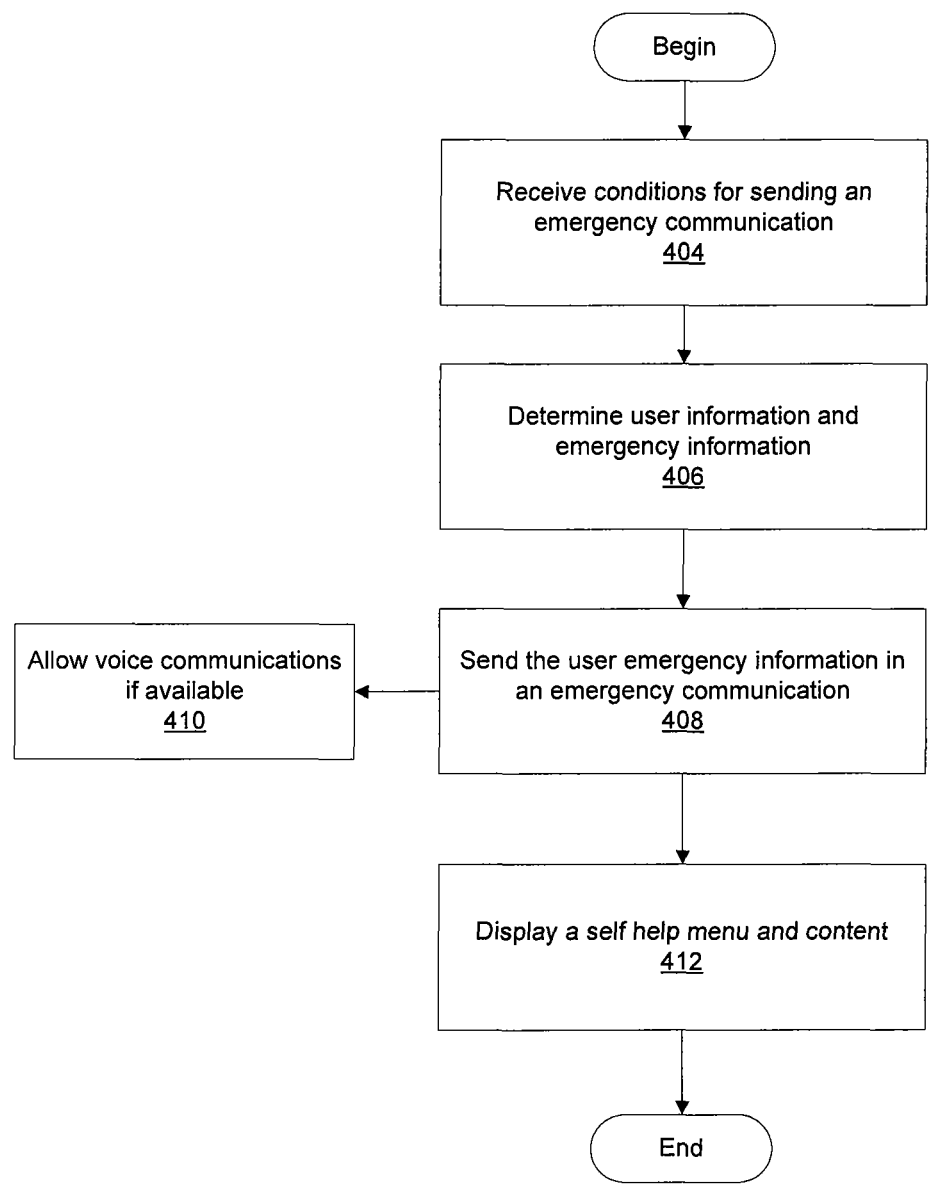
FIG. 4 is a flowchart of a process for sending emergency communications in accordance with an illustrative embodiment.

FIG. 4 is a flowchart of a process for sending emergency communications in accordance with an illustrative embodiment. The process of FIG. 4 may also be implemented by a set-top box. The process may begin by receiving conditions for sending an emergency communication (step 404). The conditions may be parameters, measurements or conditions detected by sensors embedded within the set-top box. For example, in response to detecting a large amount of water internal to the set-top box or from an external sensor the set-top box within a yacht may determine the time is appropriate to send an emergency communication with or without confirmation from a user. In one embodiment, the circuitry, logic, and other elements of the set-top box utilized to send and receive emergency communications may be shielded and protected to prevent the intrusion and damage caused by water, smoke, a collision, or other event that may potentially damage the set-top box.

Next, the set-top box determines user information and emergency information (step 406). The user information may include details saved within the set-top box that identified the user. Alternatively the user information may be saved and accessed as part of a satellite communications network. The user information and emergency information may include a determined location ascertained by the GPS device internal or external to the set-top box. In one embodiment the emergency information may include information specifying information about the emergency as self-reported by the user or as determined by the set-top box.

Next, the set-top box sends the user and emergency information in an emergency communication (step 408). The emergency communication in step 408 may utilize any number of standards, formats, or configurations as herein described. The set-top box may allow voice communication if available (step 410). In one embodiment, the set-top box may be configured to send and receive voice communications through the set-top box. For example, the set-top box may act or mimic a satellite telephone in allowing a voice communication to be sent and received from the set-top box. In another embodiment, the user may utilize a microphone on the set-top box, television, remote control or other externally linked device to record a voice message that may be sent as part of the emergency communication of step 408. For example, the user may specify that he has been out hiking and broke his leg and cannot leave his cabin in rural Idaho. As a result, the user may be able to participate in real-time or discreet voice communications based on the hardware and software configuration of the set-top box as well as the positioning and communications environment in which the set-top box is positioned.

In another embodiment, the GPS location may be forward to an emergency service provider based on a pre-determined mapping of GPS coordinates to an emergency authority table. For example, the determined location of the set-top box may be mapped against a table of local emergency service providers. The communications service provider may then notify the emergency service in an automated manner and may communicate updates or status information to a television of the user on the user end.

The set-top box may also display a self-help menu and content (step 412). The self-help menu may provide a medical and emergency dictionary like content that may allow a user to utilize symptoms, circumstances and conditions to determine possible actions that the user may take to address the emergency. For example, in the event that an individual with the user has been struck by lightening the self-help menu may provide instructions and visual representations of how to administer CPR as well as how to best prepare the individual to survive the lightening strike while emergency service providers are summoned to the location. For example, the set-top box may include a partition with informational video clips and audio clips that may be utilized by the user. In another embodiment, by activating the emergency feature of the set-top box an operator may be able to stream live video or other details providing assistance to the user. In one embodiment, the user may receive in an electronic message, purchase, or download self-help directories, dictionaries or menu options that may be saved to the DVR of the set-top box for future reference. For example, one module may be addressed to maritime emergencies and may provide information for dealing with emergencies while sailing or boating. Another module may provide information for users in remote desert locations that may experience various conditions and circumstances that require support from emergency personnel.

FIG. 5 is a pictorial representation of a graphical user interface in accordance with an illustrative embodiment. FIG. 5 illustrates one example of a graphical user interface 500. The graphical user interface 500 may include any number of selection elements, indicators, buttons, icons, fields, checks and graphical representations, menus, scrollbars, nested menus and other similar interactive elements. In one embodiment, the graphical user interface 500 may include sections 502, 504, 506, 508 and 510.

In one embodiment, the graphical user interface 500 may be linked with a specific channel. For example, channel 100 may be linked with emergency communications between the set-top box and one or more satellites or a satellite network. For example, the graphical user interface 500 may allow a user to select between an emergency or a self-help interface as shown in sections 502 and 504, respectively. Section 502 may be activated in order to immediately proceed with an emergency communication. Section 504 may be utilized before or after selecting to send an emergency communication. For example, the user may select to receive self-help in response to children with the user being affected by poison oak.

Section 506 may display location information. In one embodiment, section 506 may display a location as determined by the set-top box and corresponding satellite dish and transceiver. Section 506 may also include a user description for further providing information or details to emergency services or other individuals that may be participating in assisting the user. For example, based on the location determined by the set-top box, forest service, search and rescue, police and fire department officials may be contacted in order to coordinate the emergency response.

Section 508 may provide a nested menu that may allow a user to address the emergency situation. For example, the menu may include options for a natural disaster, being lost, injured, sick, in an accident or other situation that the user may encounter. In one embodiment, section 508 may provide a user symptoms, medication and treatment for a heart attack. For example, section 508 may provide guidance to chew up an aspirin if the user is not allergic and similarly section 510 may provide detailed symptoms that may allow the user to determine whether a heart attack is being experienced by the user or someone with the user.

Although particular embodiments of the present invention have been explained in detail, it should be understood that various changes, substitutions, and alterations can be made to such embodiments without departing from the scope of the present invention as defined by the following claims.

What is claimed:

1. A method for sending emergency communications, comprising:
   receiving an indicator of an emergency through a set-top box from a user, the indicator from the user indicating that the user or other individual is experiencing the emergency;
   in response to receiving the indicator of the emergency from the user through the set-top box, streaming real-time video content from an emergency service provider to the user through the set-top box of the user in real-time, wherein the real-time video content provides information to assist the user or other individual who is experiencing the emergency;
   determining a location associated with the emergency;
   sending a message indicating the emergency and the location associated with the emergency from the set-top box; and
   receiving a second indicator of an emergency from one or more sensors.

2. The method according to claim 1, wherein the method is performed by a set-top box.

3. The method according to claim 1, wherein the set-top box is a network device configured for emergency communications.

4. The method according to claim 1, wherein the indicator is received utilizing an emergency menu displayed to a user.

5. The method according to claim 4, wherein the emergency menu provides instructions for generating the indicator, and wherein the emergency menu provides information for interactively addressing the emergency.

6. The method according to claim 1, further comprising:
   communicating real-time information between the user of the set-top box and the emergency service provider in real-time.

7. The method according to claim 1, further comprising:
   routing the message to the emergency service provider associated with the location.

8. The method according to claim 1, further comprising:
   determining user information associated with the set-top box; and
   including the user information in the message.

9. The method according to claim 1, further comprising:
   determining the location of the set-top box at pre-defined time periods utilizing global positioning information.

10. The method according to claim 1, further comprising:
    storing a most recently determined location of the user in a database; and
    determining the emergency service provider associated with the most recently determined location utilizing a second database.

11. The method according to claim 1, wherein the one or more sensors are integrated within the set-top box and include a smoke sensor, a carbon monoxide sensor, and a water sensor for automatically generating the indicator.

12. The method according to claim 1, wherein the location includes a timestamp indicating a last time the location was determined.

13. A network device for communicating media content to a display, comprising:
    a processor configured to execute a set of instructions; and
    a memory configured to store the set of instructions, wherein the instructions are executed to:
       receive an indicator of an emergency through a network device from a user, the indicator from the user indicating that the user or other individual is experiencing the emergency;
       in response to receiving the indicator of the emergency from the user through the network device, stream real-time video content from an emergency service provider to the user or other individual who is experiencing the emergency through the network device of the user in real-time, wherein the real-time video content provides information to assist the user or other individual who is experiencing the emergency;
       determine a location associated with the emergency;
       send a message indicating the emergency and the location associated with the emergency from the network device, wherein the network device is configured to format media content for display to one or more displays; and
       receive a second indicator of an emergency from one or more sensors of a plurality of sensors.

14. The network device according to claim 13, wherein the location includes a timestamp indicating a last time the location was determined.

15. The network device according to claim 13, wherein the plurality of sensors are integrated with the set-top box for automatically determining there is an emergency, and wherein the plurality of sensors include at least a smoke sensor, a gas sensor, and a water sensor.

16. The network device according to claim 13, wherein the network device communicates with a first database and a second database, wherein the first database stores a most recently determined location of the user; and wherein the second database determines the emergency service provider associated with the most recently determined location.

17. The network device according to claim 13, wherein the network device determines the location at pre-defined intervals.

18. A network device for generating emergency communications comprising:

a user interface operable to receive user input, wherein the network device is configured to format media content for display to one or more displays;

location logic operable to determine a location of the network device;

emergency logic in communication with the location logic, the emergency logic being operable to determine there is an emergency based on user input from a user and generate a message indicating the location and the emergency, the user input from the user indicating that the user or other individual is experiencing the emergency, wherein the emergency logic is further operable to receive a signal from one or more sensors integrated with the network device indicating an emergency; and a transceiver in communication with the emergency logic, the transceiver being operable to send the message to an emergency service provider associated with the location, in response to receiving user input from the user indicating that the user or other individual is experiencing the emergency, the transceiver is operable to receive real-time video content from the emergency service provider to assist the user or other individual who is experiencing the emergency, wherein the network device is configured to format the real-time video content for display on the one or more displays.

19. The network device according to claim 18, wherein the location logic determines the location of the network device at pre-defined time periods.

20. The network device according to claim 18, wherein the message includes user information associated with the network device, and wherein the message is routed to the emergency service provider associated with the location in response to accessing a database to determine the emergency service provider utilizing the location.

* * * * *